Dec. 4, 1934.  D. AIKEN  1,982,974
PROCESS AND TOOL FOR ERADICATING TERMITES
Filed April 21, 1933  2 Sheets-Sheet 1

WITNESSES
Agnes O Slogan
Anna Byrne

INVENTOR.
Daniell Aiken
BY Rolt. E. Barry
ATTORNEYS.

Dec. 4, 1934.   D. AIKEN   1,982,974
PROCESS AND TOOL FOR ERADICATING TERMITES
Filed April 21, 1933   2 Sheets-Sheet 2
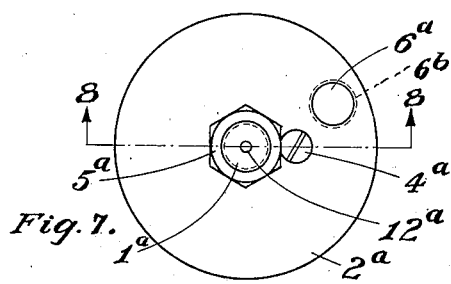
Fig. 7.
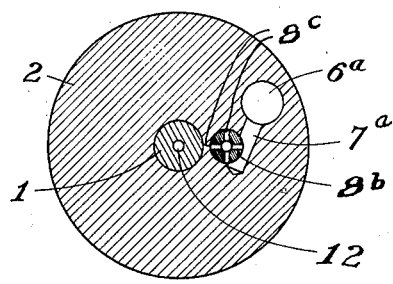
Fig. 9.
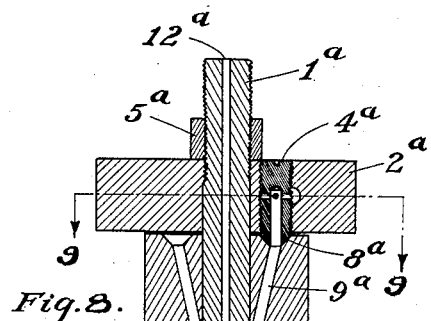
Fig. 8.
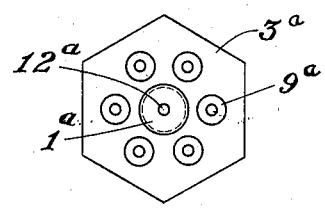
Fig. 10.
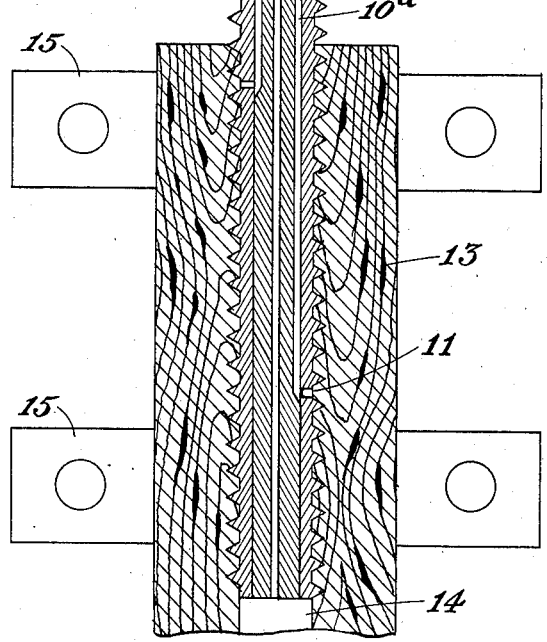
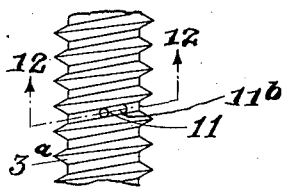
Fig. 11.
Fig. 12.
WITNESSES
Agnes O Slogan
Anna Byrne
INVENTOR.
Daniel Aiken
BY
Robt. E. Barry
ATTORNEY.

Patented Dec. 4, 1934

1,982,974

UNITED STATES PATENT OFFICE 1,982,974

PROCESS AND TOOL FOR ERADICATING TERMITES

Daniell Aiken, San Antonio, Tex., assignor of one-half to Agnes O. Slogan, San Antonio, Tex.

Application April 21, 1933, Serial No. 667,309

20 Claims. (Cl. 99—12)

This invention relates to a tool and process for use in applying insecticides to wood articles and the like.

One of the objects of the invention is to provide a tool and process for impregnating posts, timbers, etc. with tar, creosote, orthodichlorobenzine or any chemical termite eradicator.

Telephone and telegraph posts, house columns or any timber set in the ground can be treated by my invention without removing the dirt from around them.

In many cases, timbers not treated by a pressure process have become termite infested, and the only method known or used so far is a painting or spraying process which only achieves temporary results.

Another object of my invention is to furnish a special tool by means of which an insecticide can be forced under pressure progressively into wood at various points, whereby the insecticide will be delivered directly into contact with the insects which are to be destroyed.

With the foregoing objects outlined and with other objects in view which will appear as the description proceeds, the invention consists in the novel features hereinafter described in detail, illustrated in the accompanying drawings, and more particularly pointed out in the appended claims.

In the drawings,

Fig. 7 is a top plan view of a modification.

Fig. 8 is a view similar to Fig. 2, and showing the modification; said view being taken on the line 8—8 of Fig. 7.

Fig. 9 is a horizontal sectional view taken on the line 9—9 of Fig. 8.

Fig. 10 is a top plan view of the modified form with the valve wheel removed.

Fig. 11 is a view similar to Fig. 4, and showing a portion of the outer tube of the modification.

Fig. 12 is a sectional view on the line 12—12 of Fig. 11.

Figure 1:
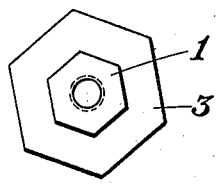
Fig. 1 is a top plan view of one form of the improved tool.
Figure 3:
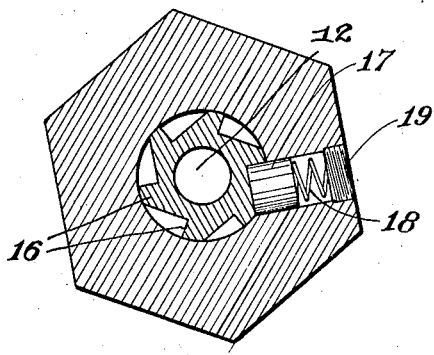
Fig. 3 is an enlarged horizontal sectional view of a detail taken on the line 3—3 of Fig. 2.
Figure 2:
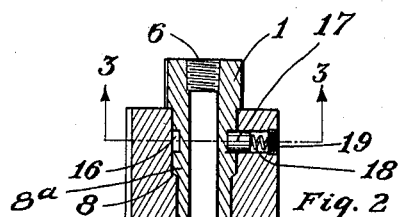
Fig. 2 is a vertical sectional view of the same, shown connected to a post undergoing treatment.
Figure 4:
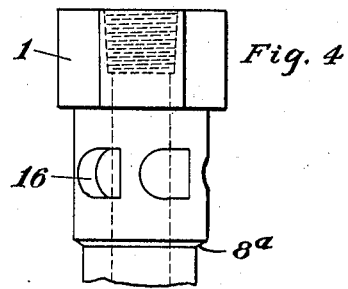
Fig. 4 is an enlarged view of the upper end of the internal tube of the tool.
Figure 5:
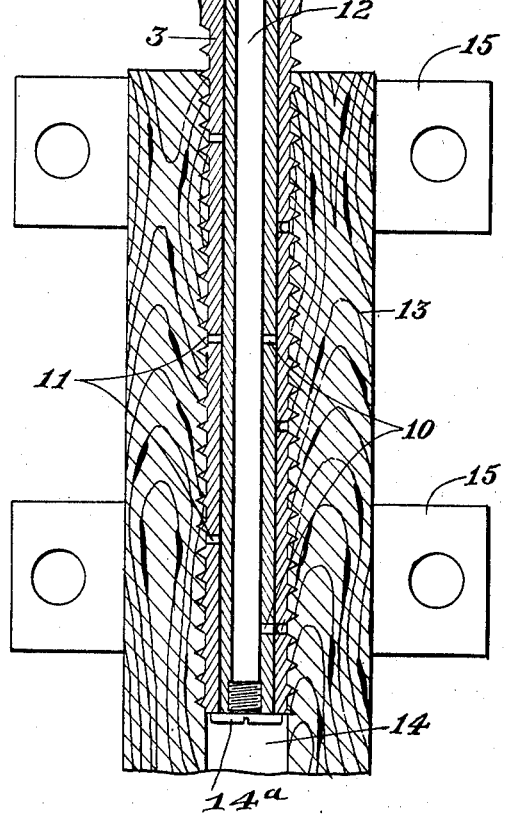
Fig. 5 is an enlarged elevation of a portion of the outside or threaded tube, and illustrating one of the slots which communicates with the holes in the outer tube.
Figure 5:
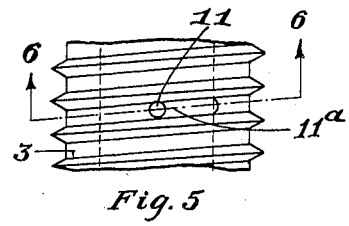
Figure 6:
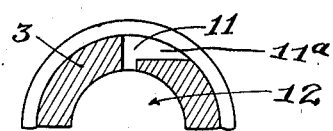
Fig. 6 is a sectional view taken on the line 6—6 of Fig. 5.

In the embodiment of the invention illustrated in Figs. 1 to 6 inclusive, 1 designates an inner rotatable tube mounted in an outer tube 3 having external screw threads. The outer tube is adapted to be screwed into a hole 14 previously bored in a timber 13 to be treated, and in order to prevent splitting of the timber, any suitable form of clamps 15 may be placed about the same.

The outer tube has an internal seat 8 which has a ground fit with a shoulder 8a on the inner tube, and to prevent leakage of liquid between the tubes, the shoulder is held on the seat by means of a screw 14a which is screwed into the lower end of the bore 12 of the inner tube and has a head bearing against the lower edge of the outer tube.

The upper ends of both tubes may be of polygonal form to facilitate turning the same with a wrench or the like.

The inner tube has apertures 10 placed at various elevations along its length and preferably out of vertical alignment with one another so that when the tube 1 is turned, such apertures may be successively brought into registration with apertures 11 in the outer tube for the purpose of discharging a liquid insecticide from the bore 12 into the timber at various points.

If the apertures 11 were of uniform diameter, they would tend to be clogged by the wood when the outer tube is screwed into the timber, and in order to prevent this, I cut slots 11a in the outer surface of the tube 3 in the grooves between the threads. One of these slots 11a communicates with each of the apertures 11 and is arranged on the drag or trailing side of the same.

For the purpose of latching the inner tube in various positions in which one of the apertures 10 registers with one of the apertures 11, the upper portion of the inner tube is provided with a circular series of teeth 16 which cooperate with a plunger 17 carried by the head of the outer tube. A spring 18 urges this plunger toward the inner tube, and a screw 19 may be employed to adjust the tension of the spring.

Internal screw threads 6 at the upper end of the inner tube permit the connection of a pressure device to the tool for the purpose of forcing a liquid insecticide into the bore 12.

With a termite extinguishing tool of the above character, timbers can be thoroughly impregnated with tar, creosote or any other penetrating chemical where termites have already entered the timber and are at work. Due to the fact that the chemical is introduced under pressure and discharged successively from various points, it will instantly follow the cavities made by the termites and eradicate the whole nest.

In towns, cities or places where there is no creosoting plant, timbers to be placed in the ground may be treated by my tool. Telephone and telegraph posts or any timbers that have been in the ground a number of years may further be protected by a treatment applied by the tool. If such timber is not to be removed from the ground, the hole 14 may be bored into the same from one side and be directed downwardly toward the center of the timber.

In use, the outer tube is inserted as tightly as possible in the timber without splitting the latter, so that when pressure is applied and the chemical forced through the bore 12 and through one of the holes 10, 11, it will enter the timber at that point. The threads on the outer tube makes control between the wood and outer tube possible. If the outside of the tube 3 were smooth with no screw threads, the liquid under the pressure of introduction would rush to the weakest part of the timber and find exit without penetrating at the point designated. The barrel or inner tube makes it possible to open only one hole at a time so that the delivery of the liquid can be positively controlled. By turning the barrel within the threaded tube, any one of the holes can be opened or closed, thus permitting only one hole in the tube to be opened at a time. By the boring of the feed holes 10, 11 on opposite sides of the tubes, the threaded tube can be screwed down into the chamber and be left at a right angle to a previous position. Thus the post can be treated at various points. It is usually advisable to screw the tool into the timber until its lower end is within about two inches from the bottom of the hole, so that after a first treatment, the tool can be screwed further down into the timber before a second treatment. This is preferable to changing position by unscrewing the tool, as the latter operation would loosen the wood around the threads and might cause leakage.

Instead of employing a bored rotatable inner tube, I may employ a grooved or channeled inner tube illustrated in Figs. 7 to 12 inclusive. In this instance, the outer tube 3a may be similar to the tube 3 with the main exception that a circular series of ports 9a will be arranged at its upper end, and these ports will converge downwardly toward the bore of the outer tube. The inner tube 1a in this embodiment, instead of being rotatable, may be fixed in position in the outer tube, and in place of using ports in the inner tube, I will employ a number of channels or grooves 10a which will extend from the passageways 9a to the apertures 11 of the outer tube. Of course, the apertures 11 will be positioned at various elevations and at different points about the circumference of the outer tube, and, as in Figs. 1 to 6 inclusive, each of the ports 11 will communicate at its outer end with a slot or groove 11b to prevent clogging of the holes 11 when the outer tube is screwed into the timber 13.

In order to feed the insecticide liquid into the passageways 9a successively, a valve wheel 2a is rotatably mounted on the upper end portion of the inner tube, and has a valve 8b adapted to engage in a liquid-tight manner the upper end of either one of the passageways 9a. The valve is rotatable to take up wear, and it is screwed into the wheel 2a and provided with a slot 4a to facilitate the operation of the valve by a screw driver or the like. Regardless of the position of the valve, its internal ports 8c communicate with a passageway 7a that communicates with a hole 6a provided in the valve wheel. The wall of the hole may be provided with threads 6b, similar to the threads 6 in Fig. 2, for the purpose of attaching a pressure fitting to the valve wheel.

When the valve of the wheel is engaging the upper end of any one of the passageways 9a, it may be locked in position by a nut 5a which is threaded on the inner tube 1a.

In the operation of the modified form of the device, assuming that a pressure fitting is screwed into the hole 6a, the liquid under pressure may then be forced into any one of the channels 10a, and out of the hole 11 communicating therewith. Obviously, if the wheel 2a is turned to bring the valve 8b successively into engagement with the upper ends of the passageways 9a, the insecticide may be forced through the holes 11 one after another.

In either form of the invention, the pressure fluid may, if desired, be forced directly into the bore 14 without passing through the holes 11. For example, in Figs. 1 to 6 inclusive, if a port is placed in the plug 14a, the liquid from the bore 12 can pass directly into the bore 14 below the tool. In Figs. 7 to 12 inclusive, the bore 12a permits the fluid to be forced directly into the hole 14 when desired.

The process and tool have been described as for the protection of timbers against termites and similar insects, but it is obvious that they may be employed to protect timbers set in the ground from rot and weather.

While I have disclosed what I now consider to be preferred embodiments of the invention in such manner that the same may be readily understood by those skilled in the art, it is apparent that changes may be made in the details disclosed, without departing from the spirit of the invention, as expressed in the claims.

What I claim and desire to secure by Letters Patent is:

1. A tool for introducing an insecticidal fluid into wood or the like, comprising a tube provided with external threads to be screwed into the article to be treated, said tube having a port in its wall leading from the bore of the tube to the threaded portion of the latter, the exterior of the tube having a slot communicating with said port and arranged between threads of the tube.

2. A tool for applying an insecticidal fluid to a wood article or the like, comprising an outer tube having external screw threads adapted to be screwed into said article, said tube having ports extending through the threaded portion of its wall at various points, and means for controllably feeding an insecticidal fluid successively through said ports.

3. A tool for applying an insecticidal fluid to a wood article or the like, comprising an outer tube having external screw threads adapted to be screwed into said article, said tube having ports extending through its wall at various points, and means for feeding an insecticidal fluid successively to said ports, the last mentioned means including an inner tube arranged within the outer tube and provided with passageways adapted to communicate with said ports.

4. A tool for applying an insecticidal fluid to a wood article or the like, comprising an outer tube having external screw threads adapted to be screwed into said article, said tube having ports extending through its wall at various points, and means for feeding an insecticidal fluid successively to said ports, the last mentioned means including an inner tube rotatably arranged in the outer tube and provided with a plurality of ports adapted to be successively brought into registration with the ports of the outer tube.

5. A tool for applying an insecticidal fluid to a wood article or the like, comprising an outer tube having external screw threads adapted to be screwed into said article, said tube having ports extending through its wall at various points, means for feeding an insecticidal fluid successively to said ports, the last mentioned means including an inner tube rotatably arranged in the outer tube and provided with a plurality of ports adapted to be successively brought into registration with the ports of the outer tube, and means for locking the inner tube in various positions of adjustment within the outer tube for holding the ports of the inner tube in registration with the ports of the outer tube.

6. A tool for applying an insecticidal fluid to an article of wood or the like, comprising an outer tube provided with external screw threads adapted to be screwed into the article to be treated, said tube having a plurality of ports arranged at various positions in its wall, means including a rotatable port and an internal tube for feeding a pressure fluid successively to the ports of the outer tube, and means for locking the rotatable port to the outer tube.

7. A tool for applying an insecticidal fluid to an article of wood or the like, comprising an outer tube having external threads adapted to be screwed into an article to be treated, ports in the wall of the tube extending from the bore of the latter to the threaded surface of the tube, an inner tube positioned within the outer tube and provided with ports adapted to be successively brought into registration with the ports of the outer tube, means for preventing the fluid from escaping between the ends of the tubes, and means for locking the ports in various positions of adjustment to the outer tube.

8. A tool for use in applying an insecticidal fluid to a wood article or the like, comprising an outer tube having external threads adapted to be screwed into the article, said tube having ports in its wall at various points, an inner tube having grooves leading to said ports, the outer tube having passageways leading to said grooves, a valve wheel rotatably mounted on the inner tube, a valve carried by the valve wheel and adapted to be brought successively into engagement with the walls of said passageways, and means including a passageway leading to said valve for connecting a pressure fluid fitting to said wheel.

9. A tool for applying an insecticidal liquid to a wood article or the like, comprising an outer tube adapted to be introduced into a bored hole in the article, said tube having ports extending through its wall at various points, and an inner tube arranged in the outer tube and having means for passing an insecticidal liquid successively from one port to the other.

10. A tool for feeding an insecticidal fluid into a wood article or the like, comprising an outer tube adapted to be screwed into said article and having an outer threaded surface snugly engaging the article to provide a liquid-tight joint, said tube having ports extending through the threaded portion of its wall at various points along the length of the outer tube, and means including an inner tube extending into the outer tube for controllably and successively feeding an insecticidal fluid to the ports of the outer tube.

11. A tool for feeding an insecticidal fluid into a wood article or the like comprising an outer tube adapted to be inserted into said article and having an outer surface to snugly engage the article to provide a liquid tight joint, said tube having ports extending through its wall at various points along the length of the outer tube, and means including an inner tube extending into the outer tube for controllably and successively feeding an insecticidal fluid to the ports of the outer tube.

12. A tool for feeding an insecticidal fluid into a wood article or the like provided with a bore, comprising a tube adapted to be inserted into said bore and having a port extending through its wall, means cooperating with said port and forming sealing means to snugly engage the surface of said bore in close proximity to said port for preventing an insecticidal fluid issuing from the port from traveling lengthwise of the bore, and means cooperating with the tube for controlling the feeding of said fluid from the tube through said port.

13. A method of eradicating boring insects in wood or the like, comprising forming a bore in said wood, introducing a confined body of insecticidal fluid into said bore, and discharging portions of said fluid from said confined body into the wood successively at predetermined points along said bore.

14. A method of eradicating boring insects in a wood article or the like, comprising forming a bore in said article, introducing a confined body of insecticidal fluid into said bore, discharging a portion of said fluid from said confined body into said bore at a predetermined point along said bore, moving said confined body of fluid lengthwise in the bore, and then forcing another portion of said fluid from said confined body into the bore of the article at a point different from that where the fluid was first discharged into said bore.

15. A method of eradicating boring insects in a wood article or the like, comprising forming a bore in said article, introducing a confined body of insecticidal fluid into the bore of the article, then forcing a portion of said insecticidal fluid from said confined body into the article at one point, and subsequently controlling the discharge of said fluid from said body into the bore to cause the fluid to successively enter the article at different spaced points.

16. A method of eradicating boring insects in a wood article or the like, consisting in forming a bore in the article to be protected, introducing a confined body of insecticidal fluid into said bore, then forcing a portion of said insecticidal fluid from said confined body into the article at one point while preventing the fluid from moving lengthwise along said bore, then moving the confined body of liquid lengthwise of the bore, and then forcing another portion of said confined body of fluid into the article at a point spaced lengthwise of the bore from the point where the fluid was first applied to the article, while preventing said fluid from moving lengthwise of the bore.

17. A method of eradicating boring insects in a wood article or the like, comprising forming a bore in said article, introducing a confined body of insecticidal fluid into the bore of the article, and discharging a portion of said fluid from said confined body into the bore at a predetermined point, while preventing said fluid from moving lengthwise of the bore beyond said predetermined point.

18. A tool for applying an insecticidal fluid to a wood article or the like, comprising an outer tube adapted to be screwed into a bore hole in the wood and to be moved lengthwise therein during the application of said fluid to the wood, said tube having external threads and a port leading from the bore of the tube to the external threaded surface of the latter, and an internal tube for controlling said port, movably arranged within the outer tube and provided with means for conveying an insecticidal fluid to said port.

19. A tool for applying an insecticidal fluid to a wood article or the like, comprising an outer tube having a plurality of ports leading from the bore of the tube to the external surface of the latter, and an internal tube movably arranged within the outer tube for successively and selectively controlling the opening or closing of each of said ports and provided with means for conveying an insecticidal fluid to said ports.

20. A tool for applying an insecticidal fluid to a wood article or the like, comprising a multi-ported impregnating member provided with external threads to be screwed into the wood to be treated and adapted to contain an insecticidal fluid, and means for selectively controlling the discharge of said fluid from each port in said member.

DANIELL AIKEN.